US012030597B2

(12) United States Patent
Sperling et al.

(10) Patent No.: US 12,030,597 B2
(45) Date of Patent: Jul. 9, 2024

(54) HIGH VOLTAGE SUBMARINE CABLE SYSTEMS

(71) Applicant: CHEVRON U.S.A. INC., San Ramon, CA (US)

(72) Inventors: Gerald Keith Sperling, Houston, TX (US); Masoud Hajiaghajani, Houston, TX (US)

(73) Assignee: CHEVRON U.S.A. INC.

( * ) Notice: Subject to any disclaimer, the term of this patent is extended or adjusted under 35 U.S.C. 154(b) by 221 days.

(21) Appl. No.: 17/382,644

(22) Filed: Jul. 22, 2021

(65) Prior Publication Data

US 2023/0029368 A1    Jan. 26, 2023

(51) Int. Cl.
*B63B 35/44* (2006.01)
*H02G 9/12* (2006.01)
*H01B 3/18* (2006.01)
*H01B 7/14* (2006.01)
*H01B 7/28* (2006.01)

(52) U.S. Cl.
CPC ............... *B63B 35/44* (2013.01); *H02G 9/12* (2013.01); *H01B 3/18* (2013.01); *H01B 7/14* (2013.01); *H01B 7/28* (2013.01)

(58) Field of Classification Search
None
See application file for complete search history.

(56) References Cited

U.S. PATENT DOCUMENTS

| | | | | |
|---|---|---|---|---|
| 9,762,061 B2* | 9/2017 | Boe | ......................... | H02J 3/22 |
| 10,056,169 B2* | 8/2018 | Hatlo | .................. | H01B 7/0225 |
| 10,373,735 B2* | 8/2019 | Marelli | ................ | H01B 7/1875 |
| 11,355,263 B2* | 6/2022 | Shroll | ...................... | H02G 9/00 |
| 11,394,203 B2* | 7/2022 | Alkhardawi | .......... | H02J 3/1821 |
| 2021/0210253 A1* | 7/2021 | Cristofani | ............ | H01B 7/2825 |
| 2021/0358656 A1* | 11/2021 | Wilson | ................. | H01B 7/1875 |
| 2023/0144999 A1* | 5/2023 | Obermeyer | .............. | H02G 9/06 |
| | | | | 174/15.6 |

FOREIGN PATENT DOCUMENTS

WO    2021034248 A1    2/2021
WO    2021052567 A1    3/2021

OTHER PUBLICATIONS

Written Opinion of the international searching authority dated Jul. 2022 in PCT/US2022/073811.

(Continued)

*Primary Examiner* — Thomas J. Hiltunen
(74) *Attorney, Agent, or Firm* — Hunton Andrews Kurth LLP

(57) ABSTRACT

A system for transmission of power offshore comprises two or more power stations operably connected with a high voltage cable system. The high voltage cable system may comprise a dynamic, dry type high voltage submarine cable of varying length configured to transmit at least about 45 megawatts of power. In some cases the dynamic, dry type high voltage submarine cable comprises a first end connected to an offshore power station and second end connected to a static submarine cable system which is connected to an onshore power station. The systems may facilitate transmission of power for applications such as compressing and/or pumping subsea natural gas in deep water.

23 Claims, 2 Drawing Sheets

(56) References Cited

OTHER PUBLICATIONS

Anonymous: ABB Commissions cable link to deliver clean power to Goliat offshore oil field, Nov. 20, 2023, pp. 1-3, [from the internet] URL https://new.abb.com/news/details/45945/abb-commissions-cable-link-to-deliver-clean-power-to-goliat-offshore-oil-field.
Weerheim, Ruben: Development of dynamic power cables for commercial floating wind farms, report Literature assignment, Nov. 12, 2018, XP055794185.
Eriksson, Erik et al., Submarine link, Nov. 17, 2011, pp. 1-6, [from the internet] URL:https://library.e.abb.com/public.

* cited by examiner

HIGH VOLTAGE SUBMARINE CABLE SYSTEMS

FIELD OF THE INVENTION

The present inventions are directed to high voltage submarine cable systems for use in, for example, power transmission offshore and/or tiebacks to onshore power generation including, for example, renewable power generation from solar, wind, or wave.

BACKGROUND AND SUMMARY

There is often a desire to transmit large amounts of power (in some cases>45 MW) from shore to a floater or from a floater to another floater to support offshore projects such as compression and pumping of natural gas, hydrocarbon exploration, hydrocarbon recovery, and the like. Unfortunately, conventional methods of such power transmission are often limited to smaller amounts of power, unreliable, and/or expensive due to multiple submarine cables being required. What is needed are new systems that can reliably transmit large amounts of power over long distances in water depths of greater than 400 meters in a cost-effective manner. Advantageously, the systems described herein meet the aforementioned needs and more.

In one embodiment, the application pertains to a system for transmission of power offshore comprising: (1) an offshore power distribution station; (2) a power transmission station; and (3) high voltage cable system operably connected to (1) and (2). Unlike prior art systems that often rely on wet type submarine cables, the instant high voltage cable system comprises a dynamic, dry type high voltage submarine cable configured to transmit at least about 45 megawatts of power.

In another embodiment the application pertains to a system for transmission of power offshore comprising: (1) an offshore power distribution station; (2) an onshore power transmission station; and (3) high voltage cable system operably connected to (1) and (2). In this embodiment the high voltage cable system comprises: a dynamic, dry type high voltage submarine cable of from about 2 to about 6 km in length and configured to transmit at least about 45 megawatts of power and wherein said dynamic, dry type high voltage submarine cable comprises a first end and a second end wherein said first end is connected to the offshore power station. A static submarine cable system is operably connected to (1) the second end of the dynamic, dry type high voltage submarine cable and (2) a high voltage land cable which is connected to the onshore power station.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
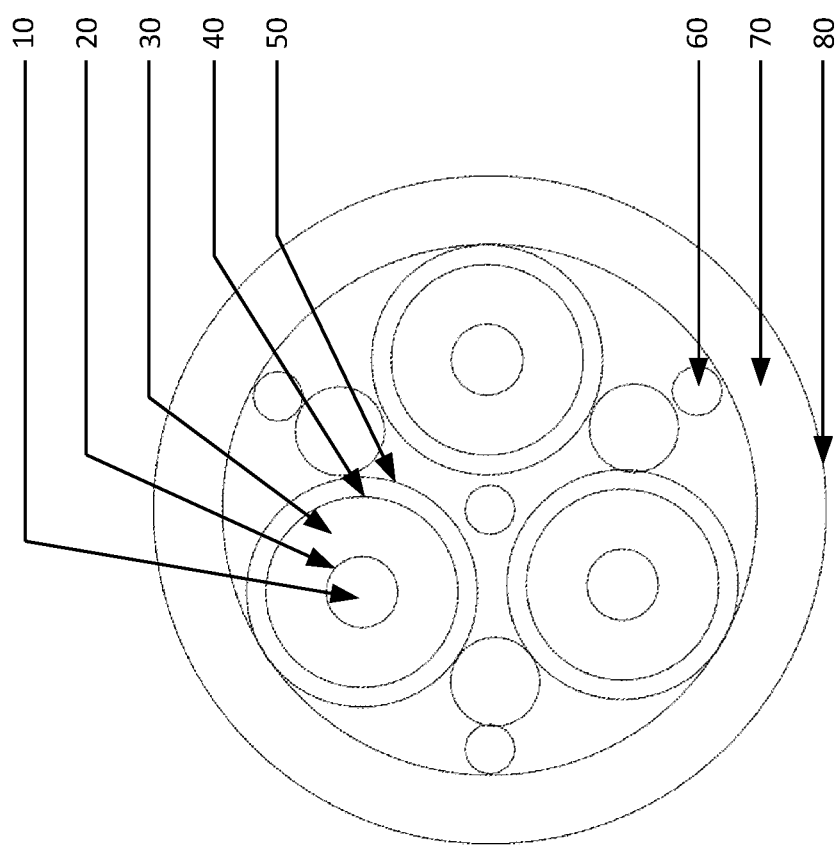
FIG. 1 shows a cross-section of a representative high voltage submarine power cable according to an example embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

The systems described herein may be used to transmit AC or DC power from one power station to another. As used herein, a power station may include generating stations or receiving stations located onshore or offshore. In some embodiments, the power stations may be generating stations, e.g., power plants, located offshore or more preferably onshore. In some embodiments the power plants may generate renewable energy or clean energy, e.g., from wind, solar, wave, biomass or clean burning natural gas or liquid natural gas.

Power may be transmitted from, for example, an onshore power generating station to one or more receiving stations such as an offshore power station like a field control station such as a semisubmersible power and control distribution floater. Advantageously, in some embodiments, using the systems described herein may be used to transmit power from a receiving station to a receiving station, e.g., from a field control station to another field control station, e.g., from one semisubmersible power and control distribution floater to another semisubmersible power and control distribution floater.

In some embodiments the power station may comprise transformers to step up or down the the voltage. For offshore power stations such as a field control station such transformers may be above the water or beneath the water. The power station may comprise other components as well such as a control center, a shunt reactor, a frequency converter, an adjustable speed drive, a wet mate connector, and/or any combination thereof. In some embodiments the power station may be operably linked to equipment in need of power such as pumps, compressors, motors, etc. In one embodiment a field control station is operably linked to subsea compression stations which may be connected to a pipeline structure.

In some embodiments a high voltage cable system is employed to operably connect an offshore power station to a second, third, or even additional power stations. The high voltage cable system typically comprises a dynamic, dry type high voltage submarine cable configured to transmit at least about 45 megawatts of power. In some embodiments the dynamic, dry type high voltage submarine cable is operably connected to additional types of cable such as wet or dry, static or dynamic submarine cables, high voltage land cables, and the like. That is, the high voltage cable system connecting a first and second power station may comprise an offshore power station connected to a dynamic, dry type high voltage submarine cable configured to transmit at least about 45 megawatts of power with a maximum voltage greater than about 40 kV. The dynamic, dry type high voltage submarine cable may in turn be connected to a static submarine cable system comprised of one or more lengths of static submarine cable which static submarine cable system may in turn be operably connected to a high voltage land cable connected to an onshore power station. In some embodiments, one or more horizontal directionally drilled ducts may be used to surround at least a portion of the high voltage cable system. These ducts may have a cross-sectional area of from about 600 to about 700 mm² and/or trenching may be useful in stabilizing one or more portions of static submarine cables. The aforementioned static submarine cables may include field joints but in many applications do not.

The specific dimensions and specification of the dynamic, dry type high voltage submarine cable may vary depending upon the specific application, water depth, water turbulence, length, and other factors. As used herein "dry" submarine cables are those configured so that a cable insulation core is not exposed to water or moisture due to the presence of a metallic barrier sheath such as lead alloy covered by an extruded anticorrosion polymeric sheath such as cross-linked polyethylene or ethylene propylene rubber.

Typically, the dry type high voltage submarine cable is configured to hang from a non-fixed platform such as an offshore semisubmersible power and control distribution floater. The dynamic, dry type high voltage submarine cable used herein is typically configured to transmit at least about 45, or at least about 60, or at least about 85 megawatts of power or more. The dynamic, dry type high voltage submarine cable used herein is typically configured to operate at a maximum voltage of greater than about 40, or greater than about 60, or greater than about 80, or greater than about 100 kV or more in some applications. The dry type high voltage submarine cable used herein may be configured to be employed in water depths of greater than about 400, or greater than about 800, or greater than about 1200 meters or even more up to about 2000 meters. Similarly, the dry type high voltage submarine cable may be employed in lengths from about 1, or about 2, or about 3, or about 4, up to about 7, or up to about 6, or up to about 5 km depending upon its cross-sectional area which may be from about 250, or from about 300, or from about 350 up to about 500, or up to about 450 mm².

As described above, the dynamic, dry type high voltage submarine cable may be connected to a static submarine cable system comprised of one or more lengths of static submarine cable which static submarine cable system may in turn be operably connected to a high voltage land cable connected to an onshore power station. The length, cross-sectional area, and type of static submarine cables in the static submarine cable system may vary depending upon the desired configuration, water depth, amount of power to be transmitted and other factors. One or more static cables in the static submarine cable system may be a dry type comprised of the materials described above for the dynamic, dry type cable. Alternatively, one or more static cables in the static submarine cable system may be a wet type wherein water and/or moisture is in direct contact with insulation core. Such wet type cables may include copper wire or tape screen that are not impervious to water and may include a non-metallic semiconductor for a conductor screen. In some embodiments, the static submarine cable system may comprise a combination of wet and dry-type cables.

The lengths of one or more static cables in the static submarine cable system vary widely. In some embodiments the lengths may be from about 30, or from about 40, or from about 50, up to about 80, or up to about 70, or up to about 65 km or more in water depths of greater than about 400, or greater than about 800, or greater than about 1200 meters or even more up to about 2000 meters. Cross-sectional areas of such one or more static cables may also vary from about 200, or from about 250, or from about 300 up to about 500, or up to about 450 mm². For shallower water depths it may be desirable to employ static cable with larger cross-sectional areas of s from about 300, or from about 400, or from about 450 up to about 650, or up to about 500 mm²

An Exemplary Embodiment of a High Voltage System

FIG. 1 shows a general construction of a submarine power cable that may be used herein wherein 10 is a conductor, 20 is a semiconductor, 30 is insulation, 40 is semiconductor, 50 is a metallic sheath/barrier, 60 is optical fiber, 70 is armor, and 80 is outer sheath. Of course, the materials in the general construction may vary depending upon whether the cable is a dry design or wet design.

Figure 2:
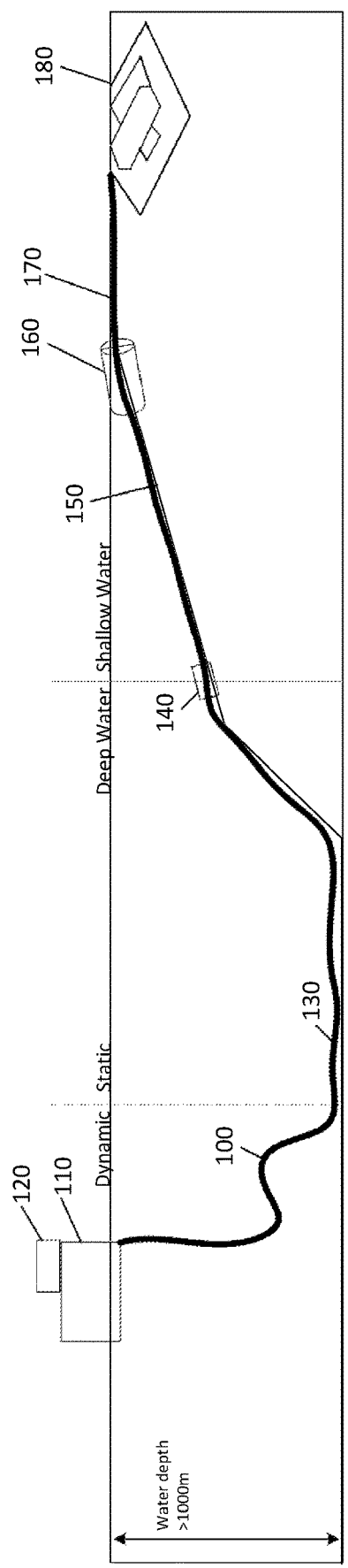
FIG. 2 shows a representative application of a system for transmission of power offshore according to an example embodiment.

As described above, the systems of the present application can be configured in many different ways using various types of submarine cables. One exemplary embodiments of many different useful configurations is shown in FIG. 2. FIG. 2 shows an embodiment capable of delivering up to or over 80 MW of power at up to or over 140 kv to a floating platform or semisubmersible 110 from an onshore power plant 180. An approximately 4 km length of dynamic, dry type high voltage submarine cable 100 having a cross-sectional area of about 400 mm² is hung from the floating platform or semisubmersible 110 in water having a depth of about 1300 meters. The floating platform or semisubmersible 110 may have a top sides transformer 120. The floating platform 110 may be used as an interface to a broader hub of power generation, power transmission, or both. Additionally or alternatively, the floating platform 110 may be used like a field control station to supply power locally to, for example, a system or components such as, but not limited to, compressors and liquid pumps.

The dynamic, dry type high voltage submarine cable 100 is connected to deep water static submarine cable 130 which has an approximately 60 km length and a cross-sectional area of 350 mm². Optional field joints such as 140 may be included if desired. A shallow water static submarine cable 150 having an approximately 500 mm² cross-sectional area is connected to the deep water static submarine cable 130. An approximately one kilometer horizontal directional drilling duct 160 with an approximate 600 mm² cross-sectional area may be employed near high voltage land cable 170 which may comprise up to three cables each with about a 600 mm² cross-sectional to connect to power plant 180. Advantageously, systems such as that described in FIG. 2 may offer tremendous advantages in cost-efficient high voltage power delivery to a network of onshore and/offshore power generation or transmission including, for example, from a floating platform to an onshore, renewable power generation.

What is claimed is:

1. A system for transmission of power offshore comprising:
   (1) an offshore power distribution station;
   (2) a power transmission station; and
   (3) high voltage cable system operably connected to (1) and (2);
   wherein said high voltage cable system comprises a dynamic, dry type high voltage submarine cable configured to transmit at least about 45 megawatts of power;
   wherein at least a portion of the dynamic, dry type high voltage submarine cable is at a water depth of from about 400 up to about 2000 meters;
   wherein the dynamic, dry type high voltage submarine cable comprises a conductor, surrounded by a semiconductor wherein the semiconductor is surrounded by an insulator, wherein the insulator is surrounded by a second semiconductor, and wherein the second semiconductor is surrounded by a metallic sheath or a barrier.

2. The system of claim 1 wherein the offshore power distribution station comprises a field control station.

3. The system of claim 1 wherein the offshore power distribution station comprises a semisubmersible power and control distribution floater.

4. The system of claim 1 wherein the power transmission station comprises:
   (1) an offshore semisubmersible power and control distribution floater; or
   (2) an onshore power station.

5. The system of claim 4 wherein the power transmission station comprises an onshore power station and wherein the onshore power station is for generating renewable energy.

6. The system of claim 5 wherein the renewable energy is generated from wind, solar, wave, or a combination thereof.

7. The system of claim 1 wherein the dynamic, dry type high voltage submarine cable comprises an extruded sheath comprising a metal.

8. The system of claim 7 wherein the metal comprises lead.

9. The system of claim 7 wherein the extruded sheath comprises a metal alloy.

10. The system of claim 1 wherein the dynamic, dry type high voltage submarine cable comprises insulation comprising cross-linked polyethylene, ethylene propylene rubber, or a combination thereof.

11. The system of claim 1 wherein the dynamic, dry type high voltage submarine cable has a cross-sectional area of from about 350 to about 450 mm$^2$.

12. The system of claim 1 wherein the dynamic, dry type high voltage submarine cable has a length of from about 2 to about 6 kilometers.

13. The system of claim 1 wherein the high voltage cable system further comprises one or more lengths of static submarine cable having a cross-sectional area of from about 250 to about 550 mm$^2$.

14. The system of claim 1 wherein the power transmission station comprises an onshore power station and wherein the high voltage cable system further comprises a high voltage land cable.

15. The system of claim 1 further comprising a third power station wherein the third power station is offshore and operably connected to the offshore power distribution station or a second power station with a high voltage submarine cable.

16. A system for transmission of power offshore comprising:
   (1) an offshore power distribution station;
   (2) an onshore power transmission station; and
   (3) high voltage cable system operably connected to (1) and (2);
   wherein said high voltage cable system comprises:
   a dynamic, dry type high voltage submarine cable of from about 2 to about 6 km in length and configured to transmit at least about 45 megawatts of power and wherein said dynamic, dry type high voltage submarine cable comprises a first end and a second end wherein said first end is connected to the offshore power distribution station; and
   a static submarine cable system operably connected to (1) the second end of the dynamic, dry type high voltage submarine cable and (2) a high voltage land cable which is connected to the onshore power transmission station;
   wherein the dynamic, dry type high voltage submarine cable comprises a conductor, surrounded by a semiconductor wherein the semiconductor is surrounded by an insulator, wherein the insulator is surrounded by a second semiconductor, and wherein the second semiconductor is surrounded by a metallic sheath or a barrier.

17. The system of claim 1 the dynamic, dry type high voltage submarine cable comprises a length of from about 1 to about 5 km.

18. The system of claim 1 the dynamic, dry type high voltage submarine cable comprises a length of from about 1 to about 5 km.

19. The system of claim 16 which further comprises horizontal directionally drilled ducts surrounding at least a portion of the high voltage cable system.

20. The system of claim 16 wherein the offshore power distribution station comprises a step-up transformer.

21. The system of claim 16 wherein the offshore power distribution station is operably connected to a compressor, a liquid pump, or a combination thereof.

22. The system of claim 1 wherein at least a portion of the dynamic, dry type high voltage submarine cable is at a water depth of from about 400 up to about 2000 meters.

23. The system of claim 16 wherein at least a portion of the dynamic, dry type high voltage submarine cable is at a water depth of from about 400 up to about 2000 meters.

\* \* \* \* \*